United States Patent
Li et al.

(10) Patent No.: US 11,977,465 B2
(45) Date of Patent: May 7, 2024

(54) METHOD FOR TESTING A COMMAND, AN APPARATUS FOR TESTING A COMMAND AND A READABLE STORAGE MEDIUM

(71) Applicant: CHANGXIN MEMORY TECHNOLOGIES, INC., Hefei (CN)

(72) Inventors: Yu Li, Hefei (CN); Teng Shi, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 66 days.

(21) Appl. No.: 17/899,056

(22) Filed: Aug. 30, 2022

(65) Prior Publication Data

US 2023/0385169 A1  Nov. 30, 2023

Related U.S. Application Data (63) Continuation of application No. PCT/CN2022/096076, filed on May 30, 2022.

(30) Foreign Application Priority Data

May 26, 2022 (CN) .......................... 202210583104.4

(51) Int. Cl.
G06F 11/00 (2006.01)
G06F 11/263 (2006.01)

(52) U.S. Cl.
CPC .................. G06F 11/263 (2013.01)

(58) Field of Classification Search
CPC ...................................................... G06F 11/263
See application file for complete search history.

(56) References Cited

U.S. PATENT DOCUMENTS

| | | | |
|---|---|---|---|
| 9,281,046 B2* | 3/2016 | Brandl | G11C 11/40603 |
| 2006/0044892 A1* | 3/2006 | Hsieh | G11C 7/1072 |
| | | | 365/193 |
| 2009/0094432 A1 | 4/2009 | Ochiai | |
| 2013/0297896 A1 | 11/2013 | Ochiai | |
| 2017/0228186 A1* | 8/2017 | Healy | G06F 3/0632 |
| 2021/0278999 A1 | 9/2021 | Chun | |
| 2022/0108747 A1 | 4/2022 | Shin et al. | |

FOREIGN PATENT DOCUMENTS

| | | |
|---|---|---|
| CN | 101403958 A | 4/2009 |
| CN | 107017017 A | 8/2017 |
| CN | 108139994 A | 6/2018 |
| CN | 114297103 A | 4/2022 |
| WO | 2016113223 A1 | 7/2016 |

* cited by examiner

*Primary Examiner* — Elmira Mehrmanesh
(74) *Attorney, Agent, or Firm* — Ladas & Parry LLP (57) ABSTRACT

A method and apparatus for testing a command are provided. The method includes that: when the test platform exists a target command to be sent to a memory, a duration of a deselect command is determined according to a minimum time interval between a target command and each of historical commands and the time when the each of the historical commands is sent and the present time; the target command is sent to the memory after the deselect command.

17 Claims, 5 Drawing Sheets

FIG. 1

```
┌─────────────────────────────────────────────────────────────┐
│ In case that the test platform exists a target command to   │
│ be sent to a memory, determining a minimum time interval    │
│ between the target command and each of historical           │──S201
│ commands sent to the memory, and a time interval between    │
│ a time when the each of the historical commands is sent     │
│ and a present time                                          │
└─────────────────────────────────────────────────────────────┘
                              │
                              ▼
┌─────────────────────────────────────────────────────────────┐
│ Determining a duration of a deselect command according to   │
│ the minimum time interval between the target command and    │──S202
│ the each of the historical commands and the time interval   │
│ between the time when the each of the historical commands   │
│ is sent and the present time                                │
└─────────────────────────────────────────────────────────────┘
                              │
                              ▼
┌─────────────────────────────────────────────────────────────┐
│ Sending the target command to the memory after the deselect │──S203
│ command                                                     │
└─────────────────────────────────────────────────────────────┘
```

METHOD FOR TESTING A COMMAND, AN APPARATUS FOR TESTING A COMMAND AND A READABLE STORAGE MEDIUM

CROSS-REFERENCE TO RELATED APPLICATIONS

This application is a continuation of International Patent Application No. PCT/CN2022/096076, filed on May 30, 2022, which is based upon and claims priority to Chinese patent application No. 202210583104.4, filed on May 26, 2022. The disclosure of the aforementioned patent applications are hereby incorporated by reference in their entirety.

BACKGROUND

In the technical field of semiconductors, a memory relates to various different commands. Since circuits in the memory needs time to respond to the received commands, a certain time interval is required between different commands.

Due to numerous command categories involved in the memory, the number of time intervals required to be determined after pairwise combination of the commands will be very large. Therefore, in daily test works, how can a test platform efficiently determine the sending time interval between the commands and accurately send each command to the memory is an urgent technical problem to be resolved at present.

SUMMARY

Embodiments of the disclosure relate to the technical field of semiconductors, and in particular, to a method for testing a command, an a apparatus for testing a command, and a readable storage medium.

Embodiments of the disclosure provide a method and apparatus for testing a command, a test platform, and a readable storage medium. The test platform can efficiently determine a sending time interval between commands, thereby accurately sending each command to a memory.

According to a first aspect, the disclosure provides a method for testing a command. The method is applied to the test platform and includes the following operations.

In case that the test platform exists a target command to be sent to a memory, a minimum time interval between the target command and each of historical commands sent to the memory, and a time interval between a time when the each of the historical commands is sent and a present time are determined. There is a timing constraint between the each of the historical commands and the target command.

A duration of a deselect command is determined according to the minimum time interval between the target command and the each of the historical commands and the time interval between the time when the each of the historical commands is sent and the present time. The deselect command is sent after a last historical command of the historical commands and before the target command.

The target command is sent to the memory after the deselect command.

According to a second aspect, the disclosure provides an apparatus for testing a command. The apparatus is applied to the test platform and includes at least one processor; and a memory configured to store a computer-executable instruction.

The at least one processor is configured to:
  determine a minimum time interval between a target command and each of historical commands sent to a memory and a time interval between a time when the each of the historical commands is sent and a present time in case that the test platform exists the target command to be sent to the memory; there is a timing constraint between the each of the historical commands and the target command;
  determine a duration of a deselect command according to the minimum time interval between the target command and the each of the historical commands and the time interval between the time when the each of the historical commands is sent and the present time, the deselect command is sent after a last historical command of the historical commands and before the target command; and
  send the target command to the memory after the deselect command.

According to a third aspect, the disclosure provides a computer-readable storage medium having stored thereon a computer-executable instruction that when executed by a processor, implements a method for testing a command provided in the first aspect. The method includes the following operations.

In case that the test platform exists a target command to be sent to a memory, a minimum time interval between the target command and each of historical commands sent to the memory, and a time interval between a time when the each of the historical commands is sent and a present time are determined. There is a timing constraint between the each of the historical commands and the target command.

A duration of a deselect command is determined according to the minimum time interval between the target command and the each of the historical commands and the time interval between the time when the each of the historical commands is sent and the present time. The deselect command is sent after a last historical command of the historical commands and before the target command.

The target command is sent to the memory after the deselect command.

DETAILED DESCRIPTION

In order to make objectives, technical solutions, and advantages of embodiments of the disclosure more clear, the technical solutions in the embodiments of the disclosure will be clearly and completely described below in combination with the drawings in the embodiments of the disclosure. It is apparent that the described embodiments are only part of the embodiments of the disclosure, rather than all the embodiments of the disclosure. Based on the embodiments in the disclosure, all other embodiments obtained by those ordinary skilled in the art without making creative effort shall fall within the protection scope of the disclosure. In addition, although the content in the disclosure is introduced according to one or several demonstrative examples, it is to be understood that each aspect of the disclosure can also individually constitute a complete implementation.

It is to be noted that, the brief description of the terms in the disclosure is only for the convenience of understanding the implementations described next, and is not intended to limit the implementations of the disclosure. Unless otherwise stated, these terms should be understood according to their ordinary and usual meanings.

The terms "first", "second", and the like in the specification and claims of the disclosure and in the above drawings are used to distinguish similar or like objects or entities and unnecessarily for limiting a specific sequence or sequential order, unless otherwise noted. It is to be understood that such terms may be interchangeable where appropriate, and can be, for example, implemented in a sequence in addition to the order illustrated or described in the embodiments of the disclosure.

Furthermore, the terms "include" and "having", as well as any variations thereof, are intended to cover a non-exclusive inclusion, for example, a product, or a device that includes a series of components is not necessarily limited to those expressly listed components, but may include other components not expressly listed or inherent to such product, or device.

The term "module" as used in the embodiments of the disclosure refers to any known or later developed hardware, software, firmware, artificial intelligence, fuzzy logic or combination of hardware or/and software code and can perform a function associated with the element.

The embodiments of the disclosure are applicable to the technical field of semiconductors, for example, applicable to a memory testing link.

In the field of semiconductors, the memory involves various different commands. Taking a Dynamic Random Access Memory (DRAM) as an example, a common command of the DRAM includes an Active command, a Precharge command, a Read command, a Write command, a Mode Register Write (MRW) command, a Mode Register Read (MRR) command, a Refresh command, a Self-Refresh command, a Powerdown command, and the like.

It is to be understood that, whenever a command is sent to a memory, circuits in the memory needs time to respond to the received commands. Therefore, in order to ensure that the memory can respond to each command, and a certain time interval is required between different commands sent to the memory. For example, the Joint Electron Device Engineering Council (JEDEC) and the Standard Performance Evaluation Corporation (SPEC) generally define the commands of different DRAM products in detail, and specifies a minimum time interval between every two commands.

During practical application, due to numerous command categories involved in the memory, the number of the minimum time intervals formed after various commands are combined in pairs of the commands will be very large, and the minimum time interval is affected by factors such as memory operating speed, mode configuration, memory structure selection, and the like. Therefore, the calculation of the minimum time interval between every two commands is complex and tedious.

Currently, in daily test works, a large portion of content is to compile test incentives. The test incentives substantially are combinations of the commands of the memory under various operating conditions. The time intervals between theses commands must be controlled according to the minimum time interval defined by the SPEC, otherwise it is an illegal or invalid incentive, and has no test meaning.

However, if a tester needs to re-calculates the time interval between the commands when a new incentive is added each time, it is no doubt that the workloads of the tester are very huge. Therefore, how to automatically calculate the minimum time interval between every two commands is an urgent technical problem to be resolved at present.

Facing the above technical problems, an embodiment of the disclosure provides a method for testing a command. In case that the test platform exists a target command to be sent to a memory, a duration of a deselect command is determined according to a minimum time interval between a target command and the each of the historical commands and the time when the each of the historical commands is sent and the present time; and the target command is sent to the memory after the deselect command. In this way, the time interval between the commands can be efficiently determined without manual participation, thereby accurately sending each command. A detailed process may refer to the following embodiments.

Figure 1:
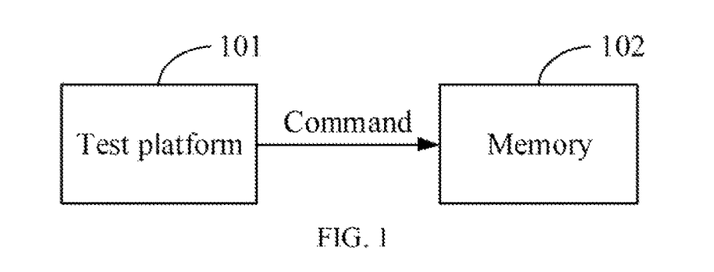
FIG. 1 is a schematic architecture diagram of a command testing system according to an embodiment of the disclosure.

Referring to FIG. 1, FIG. 1 is a schematic architecture diagram of a command testing system according to an embodiment of the disclosure.

In some embodiments of the disclosure, the command testing system includes a test platform 101 and a memory 102. The test platform 101 is communicatively connected to the memory 102.

The test platform 101 may simulate various commands used by various types of the memories. During testing, the test platform 101 may send various different commands to the memory 102, and control the sending time interval between the commands.

In addition, the test platform 101 may further have functions of receiving signal, data processing and verification, etc., for example, checking whether the memory 102 successfully executes each command.

Optionally, the memory 102 may be various types of the memories, such as the DRAM, a Read-Only Memory (ROM), and a Random Access Memory (RAM), which is not limited in this embodiment of the disclosure.

Figure 2:
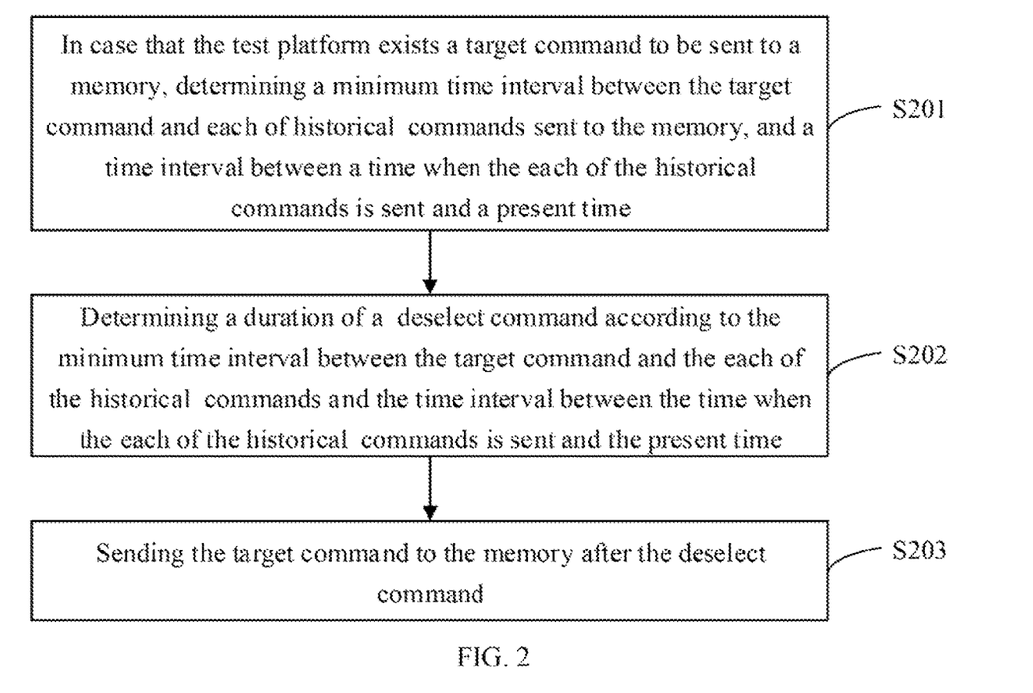
FIG. 2 is a first schematic flowchart of operations of a method for testing a command according to an embodiment of the disclosure.

Referring to FIG. 2, FIG. 2 is a first schematic flowchart of operations of a method for testing a command according to an embodiment of the disclosure. In some embodiments of the disclosure, the method for testing a command includes the following operations.

At S201, in case that the test platform exists a target command to be sent to a memory, a minimum time interval between the target command and each of historical commands sent to the memory and the time when the each of the historical commands is sent and the present time are determined.

There is a timing constraint between the each of the historical commands and the target command.

In some embodiments, the timing constraint may mainly include a period constraint, an offset constraint, a static timing path constraint, and the like.

Exemplarily, taking common setup time and hold time as examples, the setup time refers to the shortest time that a data input end signal must remain stable before a valid edge of clock. The hold time refers to the shortest time that the data input end signal must remain stable after the valid edge of clock.

It is to be understood that, under an ideal condition, as long as the valid edge of clock comes, valid data also comes (before or at the same time as the valid edge of clock), and then a sequential logic element can correctly collect the data. In addition, after the valid edge of clock (or at the same time), the output of the sequential logic element is not affected even if the data changes. However, in an actual situation, the clock edge needs time to open a switch, and a logic gate also needs time to change states (capacitor charging and discharging), so that the collection of the data requires a certain time. Within the certain time, the data cannot be changed. That is to say, before the valid edge of clock comes, the data must be "prepared" for a minimum amount of time in advance, and the minimum amount of time is the above setup time. In addition, the clock edge also needs time to close the switch. If the data changes within this time period, new data may be possibly transmitted to a next level, thereby causing an error. Therefore, the data must remain unchanged with a certain time. That is to say, after the valid edge of clock comes, the data must remain "unchanged" with a minimum amount of time, and the minimum amount of time is the above hold time.

Figure 3:
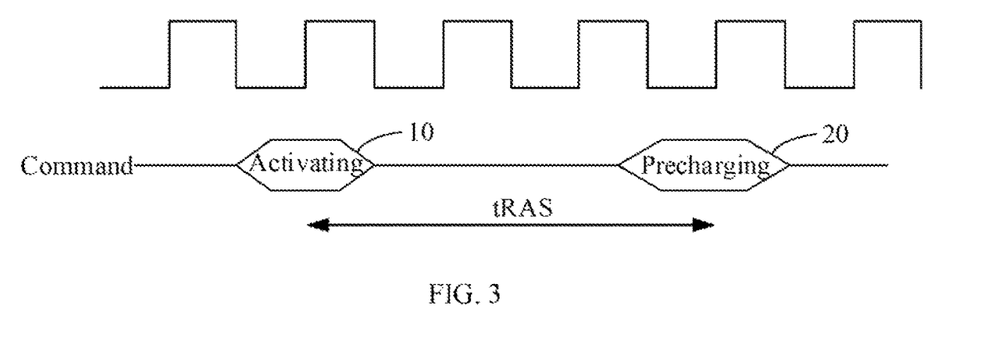
FIG. 3 is a schematic timing diagram of a time limit of a command signal for accessing a DRAM according to an embodiment of the disclosure.

In order to better understand this embodiment of the disclosure, referring to FIG. 3, FIG. 3 is a schematic timing diagram of a time limit of a command signal for accessing a DRAM according to an embodiment of the disclosure.

In FIG. 3, for simplicity, an address signal and a data signal waveform related to the DRAM are omitted. In the schematic timing diagram, an activating signal 10 (active command) indicates row accessing time, which is row address time sent to the DRAM by a DRAM controller. A precharging command 20 (precharging signal) indicates precharging command time, which is precharging command time sent to the DRAM by the DRAM controller. It is to be noted that, row active time tRAS defined in a DRAM specification needs to exist between the activating signal 10 and the precharging signal 20. In other words, the row active time tRAS needs an absolute timing gap existing between a row activation of the DRAM and precharging the row activation of the DRAM.

For example, when the active time tRAS is 20 ns, the DRAM controller cannot send the precharging signal 20 to the DRAM within 20 ns after sending the activating signal 10, otherwise the sent precharging signal 20 is an invalid signal. In order to meet the condition of the tRAS, the DRAM controller may count corresponding the number of clock cycles of the DRAM controller and the DRAM by using a counter. For example, if a frequency of a clock CLK of a DRAM sub-system is 200 MHz (that is, the clock cycle is 5 ns), the DRAM controller may perform the following operations: sending the activating signal 10; counting at least CLK4 clock cycles; and then, sending the precharging signal 20.

In some embodiments of the disclosure, when the test platform sends a new command each time, the minimum time interval between this command and each of historical commands having the timing constraint with this command (at a present configuration and rate) is first calculated. At the same time, the test platform records the time interval from the time when each of the historical commands is sent to the present time in real time.

Figure 4:
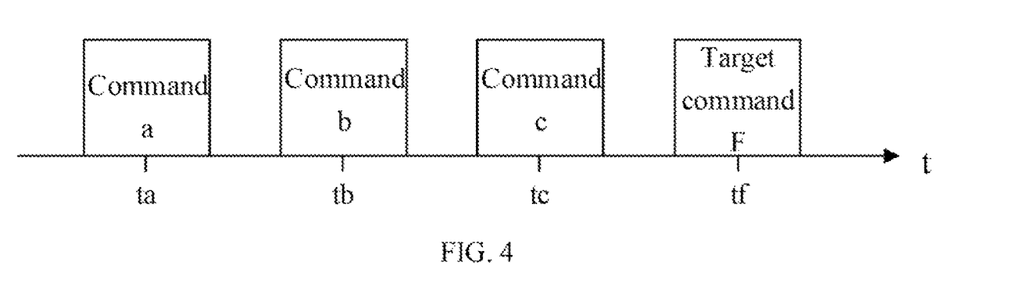
FIG. 4 is a first schematic diagram of sending time of each historical command and a target command according to an embodiment of the disclosure.

In order to better understand this embodiment of the disclosure, referring to FIG. 4, FIG. 4 is a first schematic diagram of sending time of each historical command and a target command according to an embodiment of the disclosure.

As shown in FIG. 4, assuming that the test platform exists a target command F to be sent to the memory at the present time tf, the test platform determines that a command a, a command b and a command c have a timing constraint with the target command F among the commands sent by the test platform. Then, a minimum time interval between the target command F and the command a, a minimum time interval between the target command F and the command b, and a minimum time interval between the target command F and the command c are respectively determined. At the same time, a time interval between a time ta when the command a is sent and the present time tf, a time interval between a time tb when the command b is sent and the present time tf, and a time interval between a time tc when the command c is sent and the present time tf are determined.

At S202, a duration of a deselect command is determined according to the minimum time interval between the target command and the each of the historical commands and the time interval between the time when the each of the historical commands is sent and the present time.

The deselect command is sent after a last historical command of the historical commands and before the target command.

It is to be understood that, if the time interval between the time when a certain historical command is sent and the present time is greater than or equal to the minimum time interval between this historical command and the target command, this historical command and the target command can meet a timing requirement after the target command is immediately sent. If the time interval between the time when a certain historical command is sent and the present time is less than the minimum time interval between this historical command and the target command, after the target command is immediately sent, since this historical command and the target command cannot meet the timing requirement, the memory may fail to respond or have a response error.

In some embodiments, if the time interval between the time when the certain historical command is sent and the present time is less than the minimum time interval between this historical command and the target command, in order to cause this historical command and the target command to meet the timing requirement, the deselect command may be sent according to the minimum time interval between this historical command and the target command and the time interval between the time when this historical command is sent and the present time; and then, after the deselect command is completed, the target command is then sent. Since the deselect command has a certain duration, it is equivalent to waiting for the certain duration from the present time before sending the target command.

In some embodiments, if there area plurality of historical commands in the commands sent to the memory by the test platform that have a timing constraint with the target command to be sent at present, waiting durations of the target command relative to respective ones of historical commands may be determined. Then, a maximum value in the waiting durations of the target command relative to respective ones of historical commands is selected as the duration of the deselect command.

At S203, the target command is sent to the memory after the deselect command.

In some embodiments, after the duration of the deselect command is determined, the deselect command is sent, and after the deselect command is completed, the target command is sent to the memory. It is equivalent to starting timing from the present time, and then sending the target command after waiting for the duration of the deselect command, which can ensure that the target command and each historical command can meet the timing requirement after the target command is sent.

According to the method for testing a command provided in this embodiment of the disclosure, in case that the test platform exists a target command to be sent to a memory, the duration of the deselect command is determined according to the minimum time interval between the target command and the each of the historical commands and the time interval between the time when the each of the historical commands is sent and the present time. The target command is sent to the memory after the deselect command. In this way, the time interval between the commands can be efficiently determined without manual participation, thereby accurately sending each command.

Figure 5:
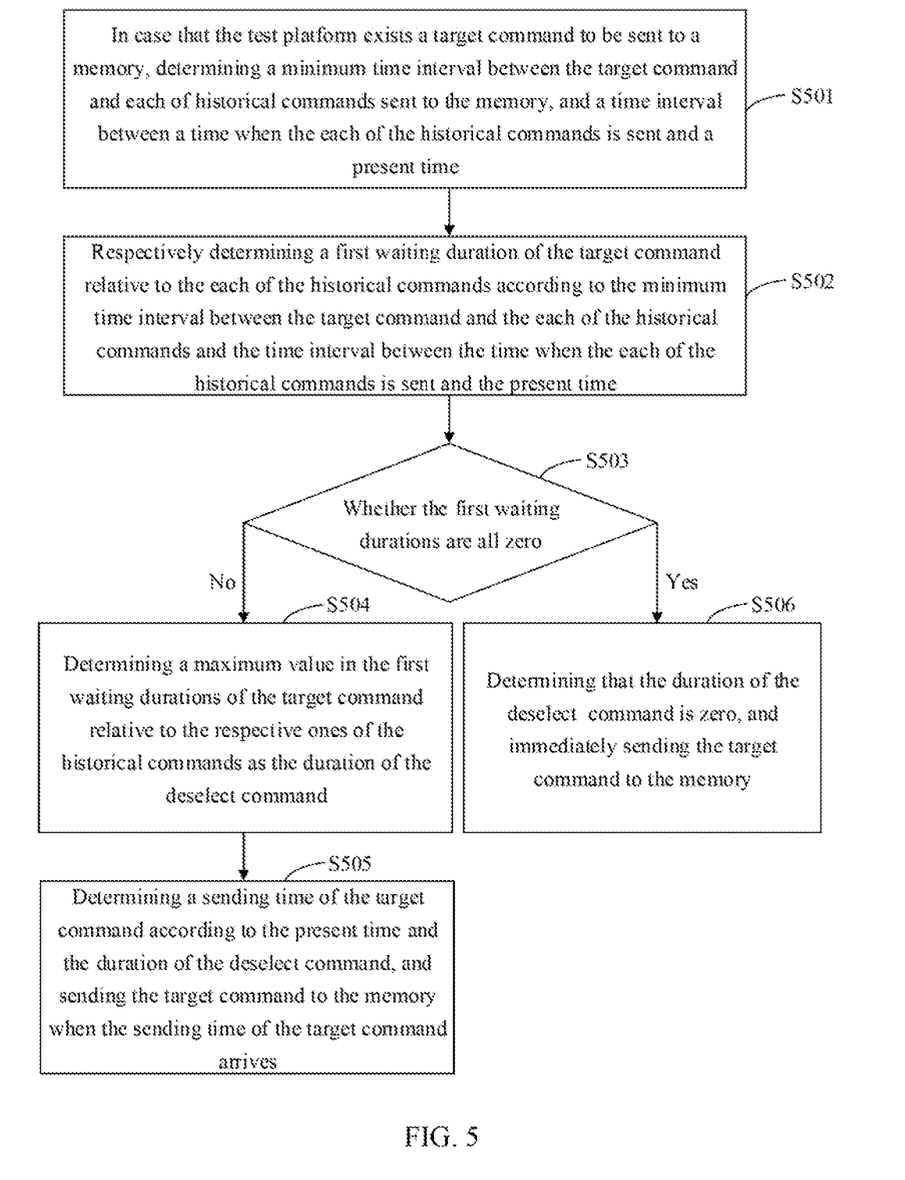
FIG. 5 is a second schematic flowchart of operations of a method for testing a command according to an embodiment of the disclosure.

Based on the described content in the above embodiments, in some embodiments, referring to FIG. 5, FIG. 5 is a second schematic flowchart of operations of a method for testing a command according to an embodiment of the disclosure. In some embodiments of the disclosure, the method for testing a command includes the following operations.

At S501, in case that the test platform exists a target command to be sent to a memory, a minimum time interval between the target command and each of historical commands sent to the memory and the time when the each of the historical commands is sent and the present time are determined.

There is a timing constraint between the each of the historical commands and the target command.

In some embodiments, the test platform may pre-obtain a timing constraint file corresponding to the memory. in case that the test platform exists a target command to be sent to a memory, each historical command that is sent to the memory by the test platform and has the timing constraint with the target command is searched based on the timing constraint file.

In some embodiments of the disclosure, in case that the test platform exists a target command to be sent to a memory, a standard rule file corresponding to the memory may be acquired, and the minimum time interval between the target command and the each of the historical commands is determined from the standard rule file.

In some other embodiments of the disclosure, in case that the test platform exists a target command to be sent to a memory, a present operating mode of the memory may be determined according to configuration information of the memory; and the minimum time interval between the target command and the each of the historical commands is determined according to a minimum time interval between commands in the present operating mode of the memory.

It is to be understood that, when the configuration information corresponding to the memory is different, the corresponding operating mode is also different.

Exemplarily, taking a brand-new Low Power Double Data Rate 5 (LPDDR5) DRAM as an example, LPDDR5 DRAM supports three operating modes, that is, a Bank-Group mode (configuring 4 Banks, 4 Bank-Group), a 8 Bank mode (configuring 8 Banks, no Bank-Group), and a 16 Bank mode (configuring 16 Banks, no Bank-Group).

When the memory is at different operating modes, corresponding speeds are also different. For example, the Bank-Group mode is applicable to a speed higher than 3200 Mbps, and allows 16-bit and 32-bit burst lengths. The 8 Bank mode supports all speeds with the burst length being 32 bits. The 16 Bank mode supports a speed below 3200 Mbps with the burst length being 16 or 32 bits.

Since the memory has different speeds under different operating modes, clock signals used by the memory under different operating modes are also different, which may lead to different minimum time intervals between the two same commands.

For example, assuming that a cycle of the clock signal used by the Bank-Group mode is X(ns), and a cycle of the clock signal used by the 16 Bank mode is Y(ns), the minimum time interval between the two commands is n clock cycles, where X≠Y, and thus under the Bank-Group mode, the minimum time interval between the two commands is n*X(ns); and under the 16 Bank mode, the minimum time interval between the two commands is n*Y (ns).

In still some other embodiments of the disclosure, in case that the test platform exists a target command to be sent to a memory, a present timing rate of the memory may be first determined; and the minimum time interval between the target command and the each of the historical commands is determined according to a minimum time interval between commands at the present timing rate of the memory.

Due to different timing rates of the memory, the cycles of the used clock signals are also different. Therefore, when the timing rates of the memory are different, the minimum time interval between the two same commands may also be different.

For example, assuming that the minimum time interval between certain two commands has been specified in the standard protocol as max (5, 12nWCK), and when 12nWCK>5, the minimum time interval between the mentioned two commands is determined by the clock signals of the memory. That is to say, if the present timing rate of the memory is higher, the minimum time interval between the mentioned two commands is smaller.

At S502, a first waiting duration of the target command relative to the each of the historical commands is respectively determined according to the minimum time interval between the target command and the each of the historical commands and the time interval between the time when the each of the historical commands is sent and the present time.

In some embodiments, whether the minimum time interval between the target command and the each of the historical commands is greater than the time interval between the time when the each of the historical commands is sent and the present time is respectively compared. In case that a first minimum time interval between the target command and a first historical command in the respective ones of the historical commands is greater than a first time interval between a time when the first historical command is sent and the present time, a difference value between the first minimum time interval and the first time interval is determined as the first waiting duration of the target command relative to the first historical command. In case that the first minimum time interval is less than or equal to the first time interval, the first waiting duration of the target command relative to the first historical command is determined as zero.

In order to better understand this embodiment of the disclosure, still referring to FIG. 4, assuming that the test platform exists a target command F to be sent to a memory at present time tf, the test platform determines that a command a, a command b and a command c have a timing constraint with the target command F among the commands sent by the test platform; Then, a minimum time interval m1 between the target command F and the command a, a minimum time interval m2 between the target command F and the command b, and a minimum time interval m3 between the target command F and the command c are respectively determined. At the same time, a time interval between a time ta when the command a is sent and the present time tf is determined as k1, a time interval between a time tb when the command b is sent and the present time tf is determined as k2, and a time interval between a time tc when the command c is sent and the present time tf is determined as k3.

In some embodiments, if m1>k1, the first waiting duration d1 of the target command F relative to the command a is: d1=m1-k1. If m1<k1, d1=0.

If m2>k2, the first waiting duration d2 of the target command F relative to the command b is: d2=m2-k2. If m2≤k2, d2=0.

If m3>k3, the first waiting duration d3 of the target command F relative to the command c is: d3=m3-k3. If m3≤k3, d3=0.

At S503, whether the first waiting durations of the target command relative to the respective ones of the historical commands are all zero is determined. In case that the first waiting durations of the target command relative to respective ones of the historical commands are not all zero, operations S504 and S505 are performed. In case that the first waiting durations of the target command relative to the respective ones of the historical commands are all zero, operation S506 is performed.

At S504, a maximum value in the first waiting durations of the target command relative to the respective ones of the historical commands is determined as the duration of the deselect command.

In some embodiments, in case that the first waiting durations of the target command relative to respective ones of the historical commands are not all zero, it indicates that the target command can only be sent after waiting for a certain duration. In order to ensure that the target command and each historical command meet the timing requirement after the target command is sent, the maximum value in the first waiting durations of the target command relative to the respective ones of the historical commands may be selected as the duration of the deselect command.

At S505, the sending time of the target command is determined according to the present time and the duration of the deselect command, and the target command is sent to the memory when the sending time of the target command arrives.

In some embodiments, after the duration of the deselect command is determined, the sending time of the target command may be determined according to the present time and the duration of the deselect command. For example, assuming that the present time is tf, the duration of the deselect command is T, and then the sending time of the target command may be determined as tf+T.

After the sending time of the target command is determined, a clock of the test platform is monitored. When the sending time of the target command is monitored to arrive, the target command is immediately sent to the memory.

At S506, the duration of the deselect command is determined as zero, and then the target command is immediately sent to the memory.

In some embodiments, in case that the first waiting durations of the target command relative to the respective ones of the historical commands are all zero, it indicates that the time interval between the time when the each of the historical commands is sent and the present time is greater than or equal to the minimum time interval between each historical command and the target command. In this case, the test platform may directly send the target command to the memory without waiting.

According to the method for testing a command provided in this embodiment of the disclosure, in case that the test platform exists a target command to be sent to a memory, the minimum time interval between the target command and the each of the historical commands is first determined. At the same time, the time interval between the time when the each of the historical commands is sent and the present time is recorded. The waiting durations of the target command relative to respective ones of the historical commands are determined according to whether the minimum time interval between the target command and the each of the historical commands is greater than the time interval between the time when the each of the historical commands is sent and the present time. The maximum value in the waiting durations of the target command relative to the respective ones of the historical commands is selected as the duration of the deselect command, thereby ensuring that the target command and each historical command can meet the timing requirement after the target command is sent.

Figure 6:
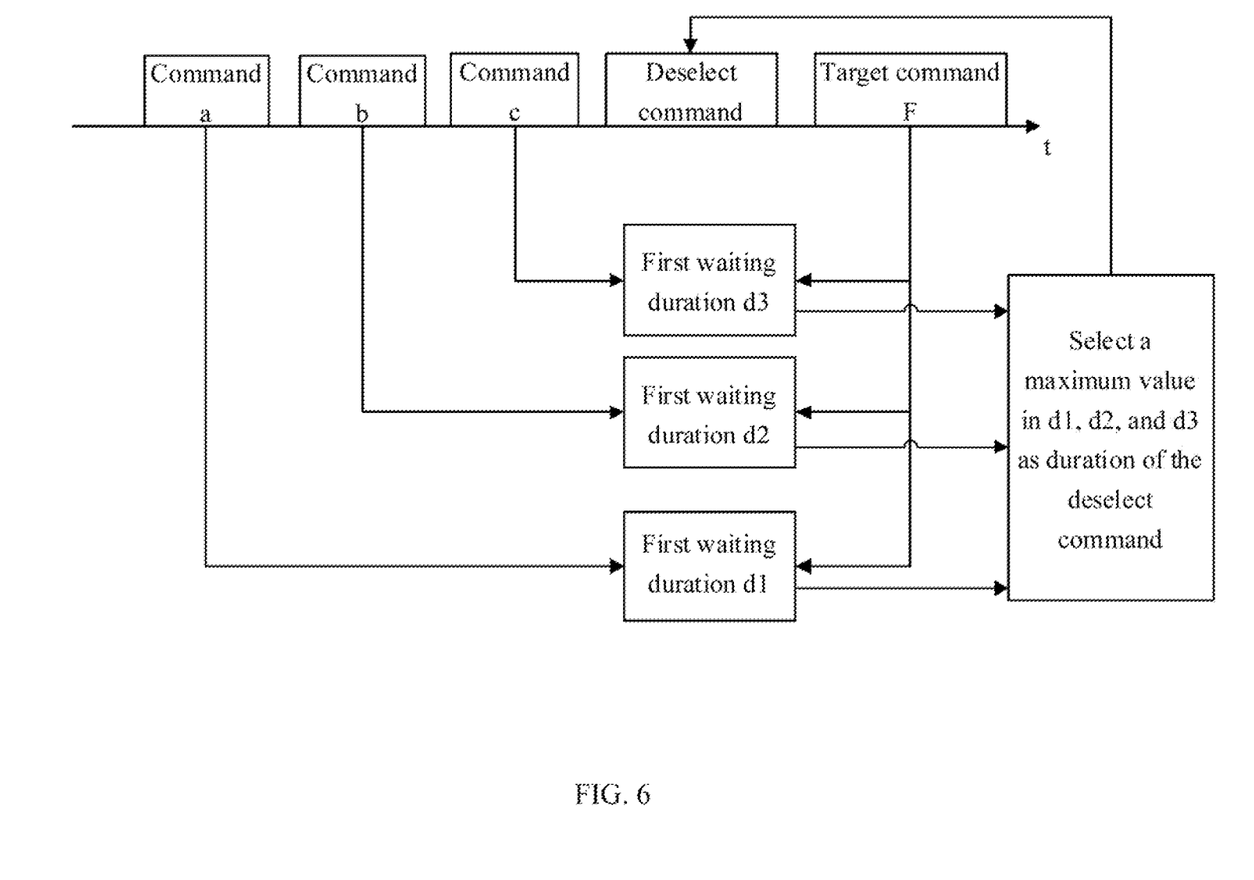
FIG. 6 is a second schematic diagram of sending time of each historical command and a target command according to an embodiment of the disclosure.

Based on the content described in the above embodiment, in order to better understand this embodiment of the disclosure, referring to FIG. 6, FIG. 6 is a second schematic diagram of sending time of each historical command and a target command according to an embodiment of the disclosure.

In some embodiments of the disclosure, assuming that the test platform exists a target command F to be sent to a memory at present time, the test platform determines that a command a, a command b and a command c have a timing constraint with the target command F among the commands sent by the test platform. If the first waiting duration of the target command F relative to the command a is determined as d1, the first waiting duration of the target command F relative to the command b is determined as d2, and the first waiting duration of the target command F relative to the command c is determined as d3, the maximum value of d1, d2, and d3 is selected as the duration of the deselect command.

In some embodiments of the disclosure, after the duration of the deselect command is determined, the time interval between the command c and the target command F may also be determined. The time interval between the command c and the target command F is equal to the time interval between the time when the command c is sent and the present time plus the duration of the deselect command.

According to the method for testing a command provided in this embodiment of the disclosure, in case that the test platform exists a target command to be sent to a memory, the sending time of the target command may be automatically determined according to the determined waiting duration of the target command relative to each of historical commands. Manual participation is not required in this process, so that the test efficiency of the memory can be effectively improved.

Figure 7:
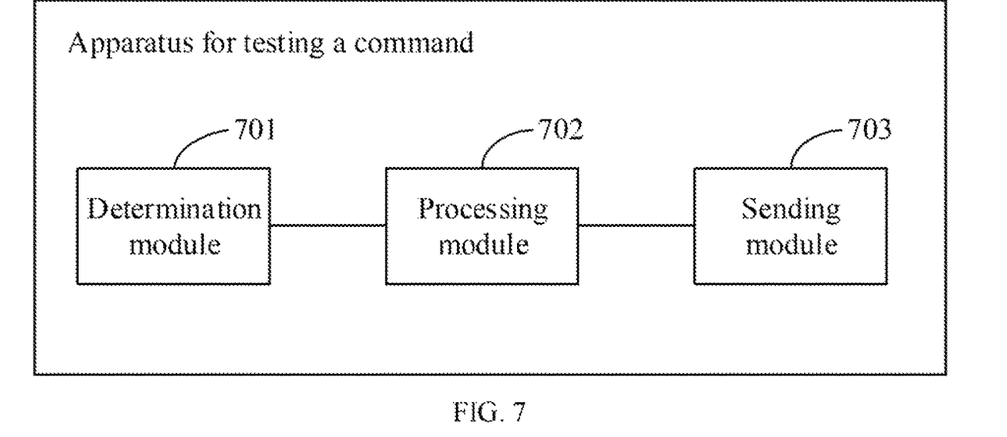
FIG. 7 is a schematic diagram of program modules of an apparatus for testing a command according to an embodiment of the disclosure.

Based on the content described in the above embodiments, an embodiment of the disclosure further provides an apparatus for testing a command, applicable to a test platform. Referring to FIG. 7, FIG. 7 is a schematic diagram of program modules of an apparatus for testing a command according to an embodiment of the disclosure. The apparatus for testing a command includes a determination module 701, a processing module 702, and a sending module 703.

The determination module 701 is configured to determine a minimum time interval between a target command and each of historical commands sent to a memory and a time interval between a time when the each of the historical commands is sent and a present time in case that the test platform exists the target command to be sent to the memory. There is a timing constraint between the each of the historical commands and the target command.

The processing module 702 is configured to determine a duration of a deselect command according to the minimum time interval between the target command and the each of the historical commands and the time interval between the time when the each of the historical commands is sent and the present time. The deselect command is sent after a last historical command of the historical commands and before the target command.

The sending module 703 is configured to send the target command to the memory after the deselect command.

In a feasible implementation, the processing module 702 is configured to:
respectively determine a first waiting duration of the target command relative to the each of the historical commands according to the minimum time interval between the target command and the each of the historical commands and the time interval between the time when the each of the historical commands is sent and the present time;
in case that the first waiting durations of the target command relative to respective ones of the historical commands are not all zero, determine a maximum value in the first waiting durations of the target command relative to the respective ones of the historical commands as the duration of the deselect command; and
in case that the first waiting durations of the target command relative to the respective ones of the historical commands are all zero, determine that the duration of the deselect command is zero.

In a feasible implementation, the processing module 702 is configured to:
respectively compare whether the minimum time interval between the target command and the each of the historical commands is greater than the time interval between the time when the each of the historical commands is sent and the present time;
in case that a first minimum time interval between the target command and a first historical command in the respective ones of the historical commands is greater than a first time interval between a time when the first historical command is sent and the present time, determine a difference value between the first minimum time interval and the first time interval as the first waiting duration of the target command relative to the first historical command; and
in case that the first minimum time interval is less than or equal to the first time interval, determine that the first waiting duration of the target command relative to the first historical command is zero.

In a feasible implementation, the sending module 703 is configured to:
in case that the duration of the deselect command is zero, immediately send the target command to the memory;
in case that the duration of the deselect command is not zero, determine a sending time of the target command according to the present time and the duration of the deselect command, and send the target command to the memory when the sending time of the target command arrives.

In a feasible implementation, the apparatus further includes a searching module, configured to:
acquire a timing constraint file corresponding to the memory; and
search, based on the timing constraint file, the each of the historical commands that is sent to the memory by the test platform and has the timing constraint with the target command.

In a feasible implementation, the determination module 701 is configured to:
determine a present operating mode of the memory according to configuration information of the memory; and
determine the minimum time interval between the target command and the each of the historical commands according to a minimum time interval between commands in the present operating mode of the memory.

In a feasible implementation, the determination module 701 is configured to:
determine a present timing rate of the memory; and
determine the minimum time interval between the target command and the each of the historical commands according to a minimum time interval between commands at the present timing rate of the memory.

It is to be noted that, content that is specifically performed by the determination module 701, the processing module 702, and the sending module 703 in this embodiment of the disclosure may refer to related content in the embodiments shown in FIG. 1 to FIG. 6, which is not described herein again.

Further, based on the content described in the above embodiments, an embodiment of the disclosure further provides a test platform. The test platform includes at least one processor and a memory. The memory stores a computer-executable instruction. The at least one processor executes the computer-executable instruction stored in the memory to implement each operation in the method for testing a command described in the above embodiments. Details are not described again in this embodiment.

Figure 8:
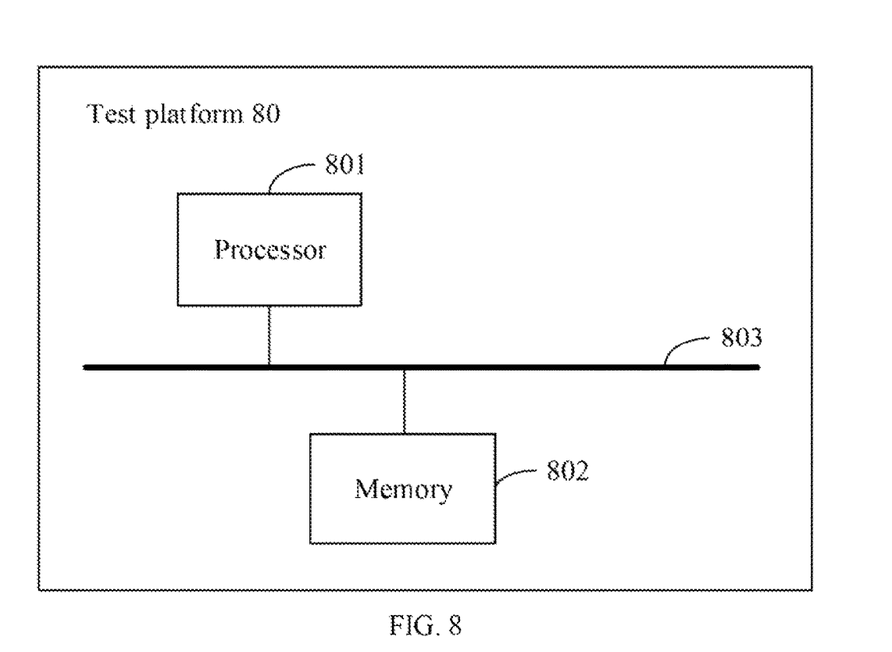
FIG. 8 is a schematic diagram of a hardware structure of a test platform according to an embodiment of the disclosure.

In order to better understand this embodiment of the disclosure, referring to FIG. 8, FIG. 8 is a schematic diagram of a hardware structure of a test platform according to an embodiment of the disclosure.

As shown in FIG. 8, the test platform 80 of this embodiment includes the processor 801 and the memory 802.

The memory 802 is configured to store the computer-executable instruction.

The processor 801 is configured to execute the computer-executable instruction stored in the memory to implement each operation in the method for testing a command described in the above embodiments. For details, refer to the related description in the foregoing method embodiments.

Optionally, the memory 802 may be independent, or may be integrated with the processor 801.

When the memory 802 is arranged independently, the device further includes a bus 803 configured to connect the memory 802 and the processor 801.

Further, based on the described content in the above embodiments, an embodiment of the disclosure further provides a computer-readable storage medium. The computer-readable storage medium stores a computer-executable instruction that when executed by a processor, implements each operation in the method for testing a command described in the above embodiments. Details are not described again in this embodiment.

In several embodiments provided by the disclosure, it is to be understood that the disclosed device and method may be implemented in other ways. For example, the device embodiment described above is only schematic, and for example, division of the modules is only logic function division, and other division manners may be adopted during practical implementation. For example, a plurality of modules may be combined or integrated into another system, or some properties may be neglected or not executed. In addition, the displayed or discussed mutual coupling or direct coupling or communication connection may be indirect coupling or communication connection through some interfaces, apparatuses or modules, and may be in electrical, mechanical or other forms.

The modules described as separate components may or may not be physically separated. The components displayed as modules may or may not be physical units, that is, the components may be located in one place, or may be distributed on the plurality of network units. Part or all of the modules may be selected according to actual requirements to achieve the purposes of the solutions of this embodiment.

In addition, each function module in each embodiment of the disclosure may be integrated into a processing module, or each module may also physically exist independently, or two or more than two modules may also be integrated into a unit. The module integrated unit may be implemented in a hardware form, or may be implemented in form of hardware and software function unit.

It is to be noted at last: the above various embodiments are only used to illustrate the technical solutions of the disclosure and not used to limit the same. Although the disclosure has been described in detail with reference to the foregoing embodiments, for those of ordinary skill in the art, they can still modify the technical solutions described in the foregoing embodiments, or equivalently replace part or all of the technical features; all these modifications and replacements shall not cause the essence of the corresponding technical solutions to depart from the scope of the technical solutions of the embodiments of the disclosure.

What is claimed is:

1. A method for testing a command, applied to a test platform, comprising:
    in case that the test platform exists a target command to be sent to a memory, determining a minimum time interval between the target command and each of historical commands sent to the memory, and a time interval between a time when the each of the historical commands is sent and a present time, wherein there is a timing constraint between the each of the historical commands and the target command;
    determining a duration of a deselect command according to the minimum time interval between the target command and the each of the historical commands and the time interval between the time when the each of the historical commands is sent and the present time, wherein the deselect command is sent after a last historical command of the historical commands and before the target command; and
    sending the target command to the memory after the deselect command;
    wherein before the determining the minimum time interval between the target command and the each of the historical commands sent to the memory, the method further comprises:
    acquiring a timing constraint file corresponding to the memory; and
    searching, based on the timing constraint file, the each of the historical commands that is sent to the memory by the test platform and has the timing constraint with the target command.

2. The method of claim 1, wherein the determining the duration of the deselect command according to the minimum time interval between the target command and the each of the historical commands and the time interval between the time when the each of the historical commands is sent and the present time comprises;
    respectively determining a first waiting duration of the target command relative to the each of the historical commands according to the minimum time interval between the target command and the each of the historical commands and the time interval between the time when the each of the historical commands is sent and the present time;
    in case that the first waiting durations of the target command relative to respective ones of the historical commands are not all zero, determining a maximum value in the first waiting durations of the target command relative to the respective ones of the historical commands as the duration of the deselect command; and
    in case that the first waiting durations of the target command relative to the respective ones of the historical commands are all zero, determining that the duration of the deselect command is zero.

3. The method of claim 2, wherein the respectively determining the first waiting duration of the target command relative to the each of the historical commands according to the minimum time interval between the target command and the each of the historical commands and the time interval between the time when the each of the historical commands is sent and the present time comprises:
    respectively comparing whether the minimum time interval between the target command and the each of the historical commands is greater than the time interval between the time when the each of the historical commands is sent and the present time;
    in case that a first minimum time interval between the target command and a first historical command in the respective ones of the historical commands is greater than a first time interval between a time when the first historical command is sent and the present time, determining a difference value between the first minimum time interval and the first time interval as the first waiting duration of the target command relative to the first historical command; and
    in case that the first minimum time interval is less than or equal to the first time interval, determining that the first waiting duration of the target command relative to the first historical command is zero.

4. The method of claim 2, wherein the sending the target command to the memory after the deselect command comprises:
    in case that the duration of the deselect command is zero, immediately sending the target command to the memory; and
    in case that the duration of the deselect command is not zero, determining a sending time of the target command according to the present time and the duration of the deselect command, and sending the target command to the memory when the sending time of the target command arrives.

5. The method of claim 1, wherein the determining the minimum time interval between the target command and the each of the historical commands sent to the memory comprises:
    determining a present operating mode of the memory according to configuration information of the memory; and
    determining the minimum time interval between the target command and the each of the historical commands according to a minimum time interval between commands in the present operating mode of the memory.

6. The method of claim 1, wherein the determining the minimum time interval between the target command and the each of the historical commands sent to the memory comprises:
    determining a present timing rate of the memory; and
    determining the minimum time interval between the target command and the each of the historical commands according to a minimum time interval between commands at the present timing rate of the memory.

7. An apparatus for testing a command, applied to a test platform, comprising:
    at least one processor; and
    a memory configured to store a computer-executable instruction;
    wherein the at least one processor is configured to:
    determine a minimum time interval between a target command and each of historical commands sent to a memory and a time interval between a time when the each of the historical commands is sent and a present time in case that the test platform exists the target command to be sent to the memory, wherein there is a timing constraint between the each of the historical commands and the target command;
    determine a duration of a deselect command according to the minimum time interval between the target command and the each of the historical commands and the time interval between the time when the each of the historical commands is sent and the present time, wherein the deselect command is sent after a last historical command of the historical commands and before the target command; and
    send the target command to the memory after the deselect command;
and further configured to:
    acquire a timing constraint file corresponding to the memory; and
    search, based on the timing constraint file, the each of the historical commands that is sent to the memory by the test platform and has the timing constraint with the target command.

8. The apparatus of claim 7, wherein the at least one processor is further configured to:
    respectively determine a first waiting duration of the target command relative to the each of the historical commands according to the minimum time interval between the target command and the each of the historical commands and the time interval between the time when the each of the historical commands is sent and the present time;
    in case that the first waiting durations of the target command relative to respective ones of the historical commands are not all zero, determine a maximum value in the first waiting durations of the target command relative to the respective ones of the historical commands as the duration of the deselect command; and
    in case that the first waiting durations of the target command relative to the respective ones of the historical commands are all zero, determine that the duration of the deselect command is zero.

9. The apparatus of claim 8, wherein the at least one processor is further configured to:
    respectively compare whether the minimum time interval between the target command and the each of the historical commands is greater than the time interval between the time when the each of the historical commands is sent and the present time;
    in case that a first minimum time interval between the target command and a first historical command in the respective ones of the historical commands is greater than a first time interval between a time when the first historical command is sent and the present time, determine a difference value between the first minimum time interval and the first time interval as the first waiting duration of the target command relative to the first historical command; and
    in case that the first minimum time interval is less than or equal to the first time interval, determine that the first waiting duration of the target command relative to the first historical command is zero.

10. The apparatus of claim 8, wherein the at least one processor is further configured to:
    in case that the duration of the deselect command is zero, immediately send the target command to the memory; and
    in case that the duration of the deselect command is not zero, determine a sending time of the target command according to the present time and the duration of the deselect command, and send the target command to the memory when the sending time of the target command arrives.

11. The apparatus of claim 7, wherein the at least one processor is further configured to:
    determine a present operating mode of the memory according to configuration information of the memory; and
    determine the minimum time interval between the target command and the each of the historical commands according to a minimum time interval between the commands in the present operating mode of the memory.

12. The apparatus of claim 7, wherein the at least one processor is further configured to:
    determine a present timing rate of the memory; and
    determine the minimum time interval between the target command and the each of the historical commands according to a minimum time interval between commands at the present timing rate of the memory.

13. A non-transitory computer-readable storage medium having stored thereon a computer-executable instruction that when executed by a processor, implements a method for testing a command, wherein the method comprises:
    in case that the test platform exists a target command to be sent to a memory, determining a minimum time interval between the target command and each of historical commands sent to the memory, and a time interval between a time when the each of the historical commands is sent and a present time, wherein there is a timing constraint between the each of the historical commands and the target command;
    determining a duration of a deselect command according to the minimum time interval between the target command and the each of the historical commands and the time interval between the time when the each of the historical commands is sent and the present time, wherein the deselect command is sent after a last historical command of the historical commands and before the target command; and sending the target command to the memory after the deselect command;

wherein before the determining the minimum time interval between the target command and the each of the historical commands sent to the memory, the method further comprises:

acquiring a timing constraint file corresponding to the memory; and searching, based on the timing constraint file, the each of the historical commands that is sent to the memory by the test platform and has the timing constraint with the target command.

14. The non-transitory computer-readable storage medium of claim 13, wherein the determining the duration of the deselect command according to the minimum time interval between the target command and the each of the historical commands and the time interval between the time when the each of the historical commands is sent and the present time comprises:

respectively determining a first waiting duration of the target command relative to the each of the historical commands according to the minimum time interval between the target command and the each of the historical commands and the time interval between the time when the each of the historical commands is sent and the present time;

in case that the first waiting durations of the target command relative to respective ones of the historical commands are not all zero, determining a maximum value in the first waiting durations of the target command relative to the respective ones of the historical commands as the duration of the deselect command; and in case that the first waiting durations of the target command relative to the respective ones of the historical commands are all zero, determining that the duration of the deselect command is zero.

15. The non-transitory computer-readable storage medium of claim 14, wherein the respectively determining the first waiting duration of the target command relative to the each of the historical commands according to the minimum time interval between the target command and the each of the historical commands and the time interval between the time when the each of the historical commands is sent and the present time comprises:

respectively comparing whether the minimum time interval between the target command and the each of the historical commands is greater than the time interval between the time when the each of the historical commands is sent and the present time;

in case that a first minimum time interval between the target command and a first historical command in the respective ones of the historical commands is greater than a first time interval between a time when the first historical command is sent and the present time, determining a difference value between the first minimum time interval and the first time interval as the first waiting duration of the target command relative to the first historical command; and in case that the first minimum time interval is less than or equal to the first time interval, determining that the first waiting duration of the target command relative to the first historical command is zero.

16. The non-transitory computer-readable storage medium of claim 14, wherein the sending the target command to the memory after the deselect command comprises:

in case that the duration of the deselect command is zero, immediately sending the target command to the memory; and in case that the duration of the deselect command is not zero, determining a sending time of the target command according to the present time and the duration of the deselect command, and sending the target command to the memory when the sending time of the target command arrives.

17. The non-transitory computer-readable storage medium of claim 13, wherein the determining the minimum time interval between the target command and the each of the historical commands sent to the memory comprises;

determining a present operating mode of the memory according to configuration information of the memory; and determining the minimum time interval between the target command and the each of the historical commands according to a minimum time interval between commands in the present operating mode of the memory.

* * * * *